US012462418B2

(12) United States Patent
Krishnan Gorumkonda et al.

(10) Patent No.: US 12,462,418 B2
(45) Date of Patent: Nov. 4, 2025

(54) MONOCULAR CAMERA DEFOCUS FACE MEASURING

(71) Applicant: Snap Inc., Santa Monica, CA (US)

(72) Inventors: Gurunandan Krishnan Gorumkonda, Kirkland, WA (US); Shree K. Nayar, New York, NY (US); Yicheng Wu, Boston, MA (US)

(73) Assignee: Snap Inc., Santa Monica, CA (US)

( * ) Notice: Subject to any disclaimer, the term of this patent is extended or adjusted under 35 U.S.C. 154(b) by 326 days.

(21) Appl. No.: 18/144,187

(22) Filed: May 6, 2023

(65) Prior Publication Data

US 2023/0360251 A1    Nov. 9, 2023

Related U.S. Application Data

(60) Provisional application No. 63/339,248, filed on May 6, 2022.

(51) Int. Cl.
*G06T 7/70* (2017.01)
*G06V 40/16* (2022.01)

(52) U.S. Cl.
CPC .............. *G06T 7/70* (2017.01); *G06V 40/161* (2022.01); *G06T 2207/30201* (2013.01)

(58) Field of Classification Search
CPC ................................. G06T 7/70; G06V 40/161
See application file for complete search history.

(56) References Cited

U.S. PATENT DOCUMENTS 8,723,912 B2    5/2014  Michrowski et al.
10,620,454 B2 *  4/2020  El-Hajal ............. G02C 13/005

FOREIGN PATENT DOCUMENTS

WO    2021145913 A1    7/2021

OTHER PUBLICATIONS

Guo et al, "Deep Eyes: Binocular Depth-from-Focus on Focal Stack Pairs", PRCV, pp. 353-365, Oct. 2019 (Year: 2019).*
Fujimura, Yuki et al.: "Deep Depth from Focal Stack with Defocus Model for Camera-Setting Invariance," Cornell University, Ithaca, New York, Feb. 26, 2022 (Feb. 26, 2022), 13 pages.
International Search Report and Written Opinion for International Application No. PCT/US2023/021268, dated Aug. 11, 2023 (Aug. 11, 2023)—13 pages.

* cited by examiner

*Primary Examiner* — Edward Park
(74) *Attorney, Agent, or Firm* — CM Law; Stephen J. Weed

(57) ABSTRACT

A device that measures a size of a user's face, referred to as face scaling, using a monocular camera. Depth is calculated from sparse feature points. A face mesh is used to improve the estimation accuracy. A processing pipeline detects face features by applying a face landmark detection algorithm to find the important face feature points such as the eyes, nose, and mouth. The processing pipeline estimates feature points depth using depth obtained through image defocus. The processing pipeline further scales the face using an estimated depth of the face features.

9 Claims, 6 Drawing Sheets

MONOCULAR CAMERA DEFOCUS FACE MEASURING

TECHNICAL FIELD

Examples set forth in the present disclosure relate to a device having a monocular camera.

BACKGROUND

In virtual try-on and augmented reality (AR) shopping, it is important to understand the actual size of a product so that the users know which size of the product they should purchase.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures.

DETAILED DESCRIPTION

A device that measures a size of a user's face, referred to as face scaling, using a monocular camera. No dense depth map is required, as depth calculated from sparse feature points is sufficient. Depth is used to get an accurate scale from one or a few initial image frames captured by the monocular camera, such as a front facing monocular camera of a smartphone. After that, the scale is calculated by the device's processor using face tracking. A face mesh is used to improve the estimation accuracy. A processing pipeline detects face features by applying a face landmark detection algorithm to find the important face feature points such as the eyes, nose, and mouth. The processing pipeline estimates feature points depth using depth obtained through image defocus. The processing pipeline further scales the face using an estimated depth of the face features.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages, and novel features are provided in the following description will become apparent to those skilled in the art upon examination of the description and the accompanying drawings, or may be learned through production or operation of the examples. The objects and advantages of the present subject matter may be realized and attained using the methodologies, instrumentalities and combinations particularly pointed out herein.

Reference now is made in detail to the examples illustrated in the accompanying drawings and discussed below.

Figure 1:
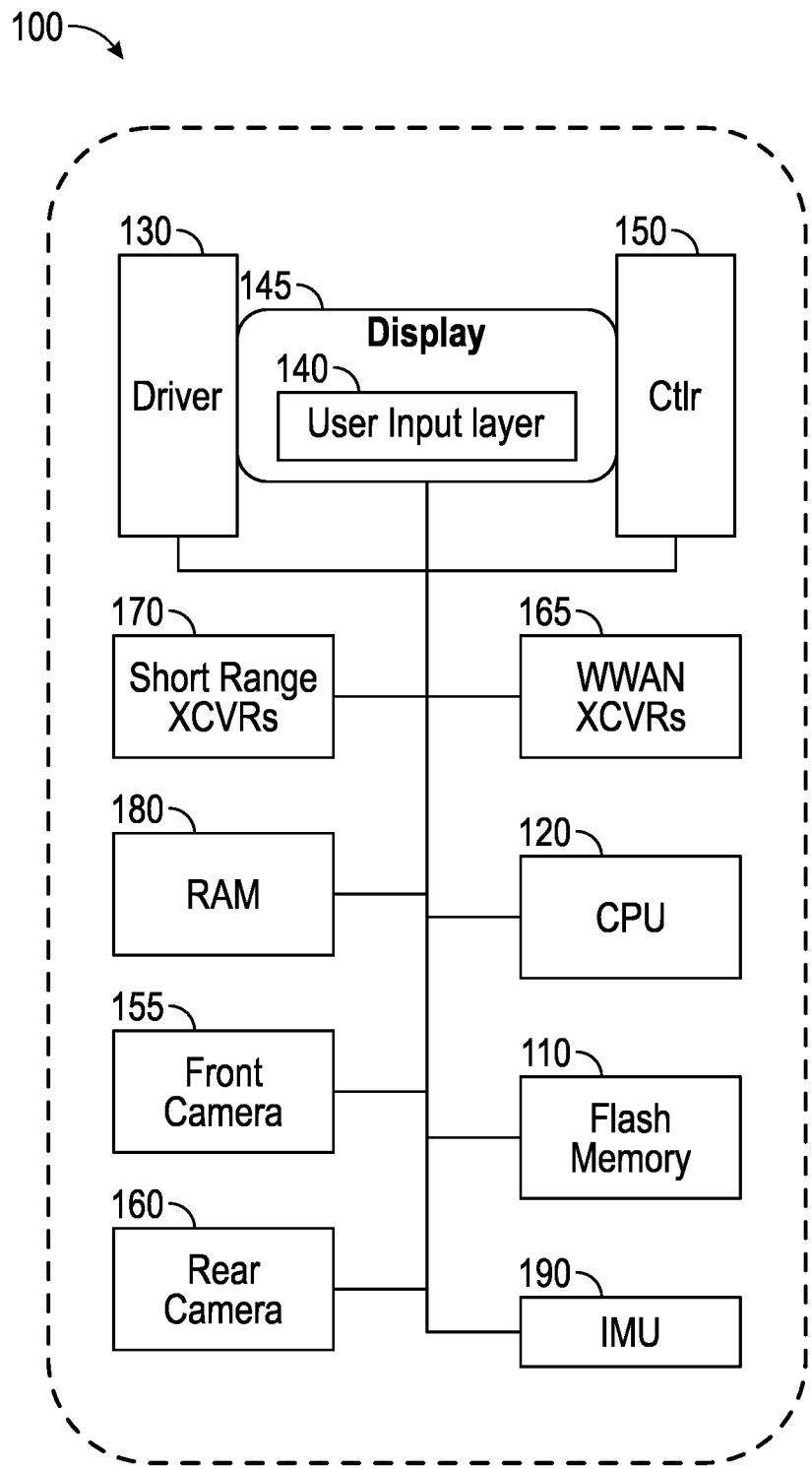
FIG. 1 is a high-level functional block diagram of an example device that includes a monocular camera.

FIG. 1 illustrates a high-level functional block diagram of an example mobile device in a sample configuration. As illustrated, smartphone 100 includes a flash memory 110 that stores programming to be executed by a CPU 120 to perform all or a subset of the functions described herein. As shown in FIG. 1, the CPU 120 of the smartphone 100 includes a mobile display driver 130, a user input layer 140 (e.g., a touchscreen) of a front facing image display 145, a display controller 150, a front facing visible light camera 155, and one or more rear facing visible light cameras 160 with substantially overlapping fields of view. In such a configuration, the flash memory 110 may further include multiple images or video, which are generated via the cameras.

As shown in FIG. 1, the smartphone 100 may further include at least one digital transceiver (XCVR) 165, shown as WWAN XCVRs, for digital wireless communications via a wide-area wireless mobile communication network. The smartphone 100 also may include additional digital or analog transceivers, such as short-range transceivers (XCVRs) 170 for short-range network communication, such as via NFC, VLC, DECT, ZigBee, BLUETOOTH®, or WI-FI®. For example, short range XCVRs 170 may take the form of any available two-way wireless local area network (WLAN) transceiver of a type that is compatible with one or more standard protocols of communication implemented in wireless local area networks, such as one of the WI-FI® standards under IEEE 802.11. In certain configurations, the XCVRs 170 also may be configured to communicate with a global event database.

To generate location coordinates for positioning of the smartphone 100, smartphone 100 also may include a global positioning system (GPS) receiver. Alternatively, or additionally, the smartphone 100 can utilize either or both the short range XCVRs 170 and WWAN XCVRs 165 for generating location coordinates for positioning. For example, cellular network, WI-FI®, or BLUETOOTH® based positioning systems can generate very accurate location coordinates, particularly when used in combination.

The transceivers 165, 170 (i.e., the network communication interface) may conform to one or more of the various digital wireless communication standards utilized by modern mobile networks. Examples of WWAN transceivers 165 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G," or 5G New Radio, referred to as "5G." For example, the transceivers 165, 170 provide two-way wireless communication of information including digitized audio signals, still image and video signals, web page information for display as well as web-related inputs, and various types of mobile message communications to/from the smartphone 100.

The smartphone 100 further includes a microprocessor that functions as a central processing unit (CPU) shown as CPU 120 in FIG. 1. A microprocessor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 120. The CPU 120, for example, may be based on any known or available microprocessor architecture, such as a Reduced Instruction Set Computing (RISC) using an ARM architecture, as commonly used today in mobile devices and other portable electronic devices. Of course, other arrangements of microprocessor circuitry may be used to form the CPU 120 or microprocessor hardware in a smartwatch, smartphone, laptop computer, and tablet.

The CPU 120 serves as a programmable host controller for the smartphone 100 by configuring the smartphone 100 to perform various operations in accordance with instructions or programming executable by CPU 120. For example, such operations may include various general operations of the smartphone 100, as well as operations related to the programming for applications on the smartphone 100. Although a microprocessor may be configured by use of hardwired logic, typical microprocessors in mobile devices are general processing circuits configured by execution of programming.

The smartphone 100 further includes a memory or storage system, for storing programming and data. In the example illustrated in FIG. 1, the memory system may include the flash memory 110, a random-access memory (RAM) 180, local event database, and other memory components as needed. The RAM 180 may serve as short-term storage for instructions and data being handled by the CPU 120, e.g., as a working data processing memory, while the flash memory 110 typically provides longer-term storage.

Hence, in the example of smartphone 100, the flash memory 110 is used to store programming or instructions for execution by the CPU 120. Depending on the type of device, the smartphone 100 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

In sample configurations, the CPU 120 may construct a map of the environment surrounding the smartphone 100, determine a location of the smartphone 100 within the mapped environment, and determine a relative position of the smartphone 100 to one or more objects in the mapped environment. The CPU 120 may construct the map and determine location and position information using a simultaneous localization and mapping (SLAM) algorithm applied to data received from one or more sensors.

Sensor data may include images received from cameras 155 and 160, distance(s) received from a laser range finder, position information received from a GPS unit, motion and acceleration data received from an inertial measurement unit (IMU) 190, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate, in other words, calculating and updating the mapping and localization thirty times per second. The approach described here can be used in any computing device for scaling faces, such as a laptop computer and a tablet computer, and is not limited to a smartphone.

Knowing the true size of a user's face enables virtual try-on experiences like glasses, jewelry, etc. However, measuring the true size of a user's face using a smartphone's single front-facing camera is an unsolved problem. This disclosure leverages the amount of defocus in the captured images of the face using the front-facing camera to estimate the true size of the face. In virtual try-on and augmented reality (AR) shopping, it is important to know the actual size of the product so that the users know which size of the product they should purchase. However, due to image scale ambiguity, it is difficult to find the right scale of the face without knowing the depth of the face from the camera.

Currently, monocular cameras such as front-facing cameras on mobile devices support adjustable focal distance by adjusting the distance of the lens from the image sensor. In principle, based on the camera focal length and the lens position, the actual depth of the focal plane can be calculated, where all the objects at this focal plane are in-focus. This disclosure includes two approaches. The first approach relies on the auto-focus function in the camera. The camera autofocuses on the face features with textures such as the eyes, and then a processor of the smartphone obtains the focal distance from the camera application programming interface (API) for each feature region. The second approach is to capture a focal stack—a set of images captured at different focal distances. For each face feature, the image with the sharpest face feature(s) is selected by the smartphone processor, and the corresponding focal distance is the approximate depth of the face feature(s). The depth can be further improved based on the interpolation of several images with similar focal distances. To further improve the accuracy, a face mesh is applied. Face mesh is a solution that estimates three-dimensional (3D) face landmarks in real-time on mobile devices. It employs machine learning (ML) to infer the 3D facial surface, requiring only a single camera input without the need for a dedicated depth sensor. For the eye distance, instead of using the regular pupil distance, the distance between the left corner of the left eye and the right corner of the right eye is calculated because the eye distance is more robust to face motion and expression. Then, the eye distance is used as a scale to calculate the actual size of all face parts.

Figure 2:
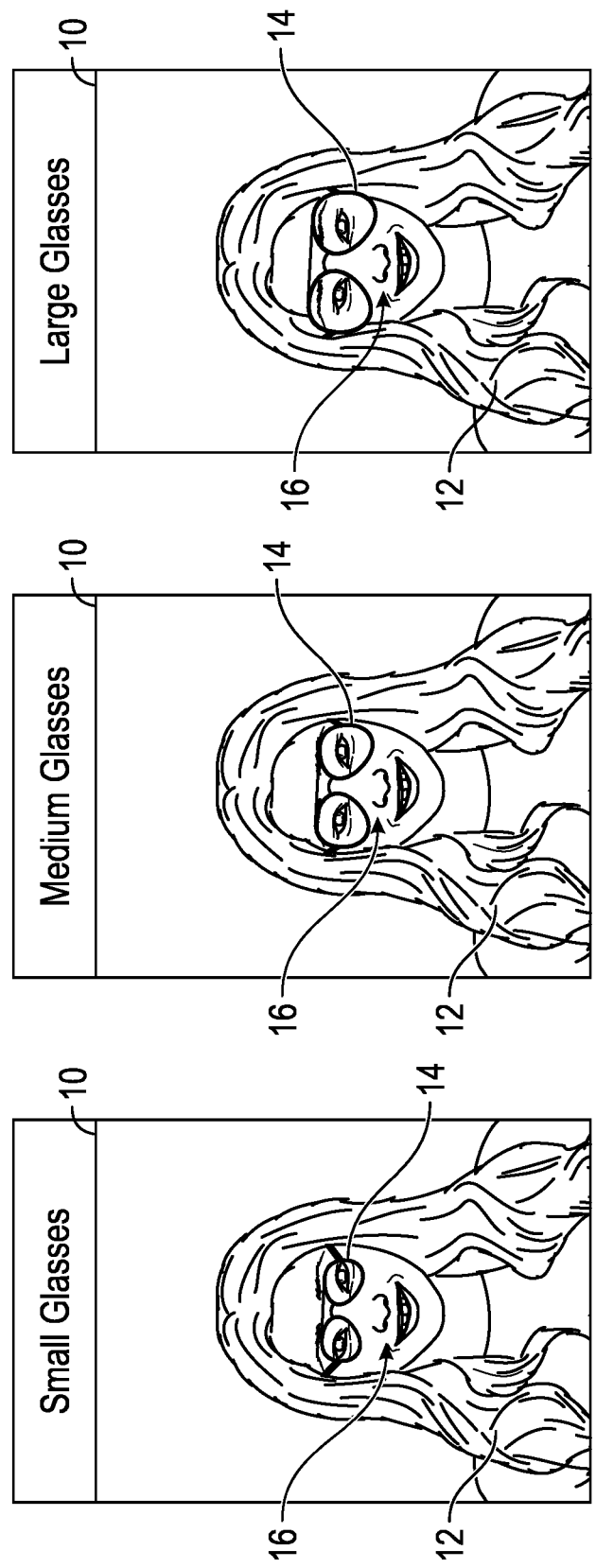
FIG. 2 are images of a user with different sizes of a product, shown as eyeglasses, overlaid on a user face.

Referring to FIG. 2, images 10 show a user 12 with different sizes of a product 14, shown as eyeglasses as an example, overlaid on a user face 16 that is to scale. The CPU 120 calculates the scale of the user face 16 using the single front facing monocular camera 155 of the smartphone 100, and then displays the images 10 of the user 12 wearing the product 14 on the display 145.

Figure 3A:
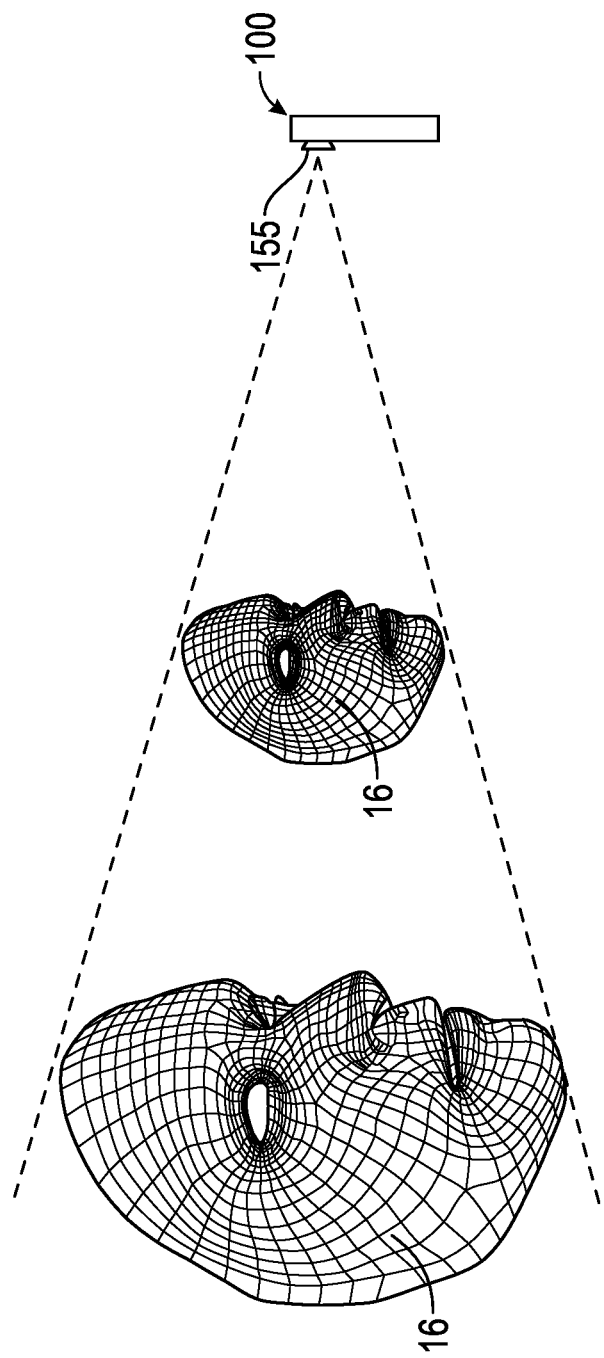
FIGS. 3A and 3B are illustrations depicting image scale ambiguity when a single front facing monocular camera images the user face.
Figure 3B:
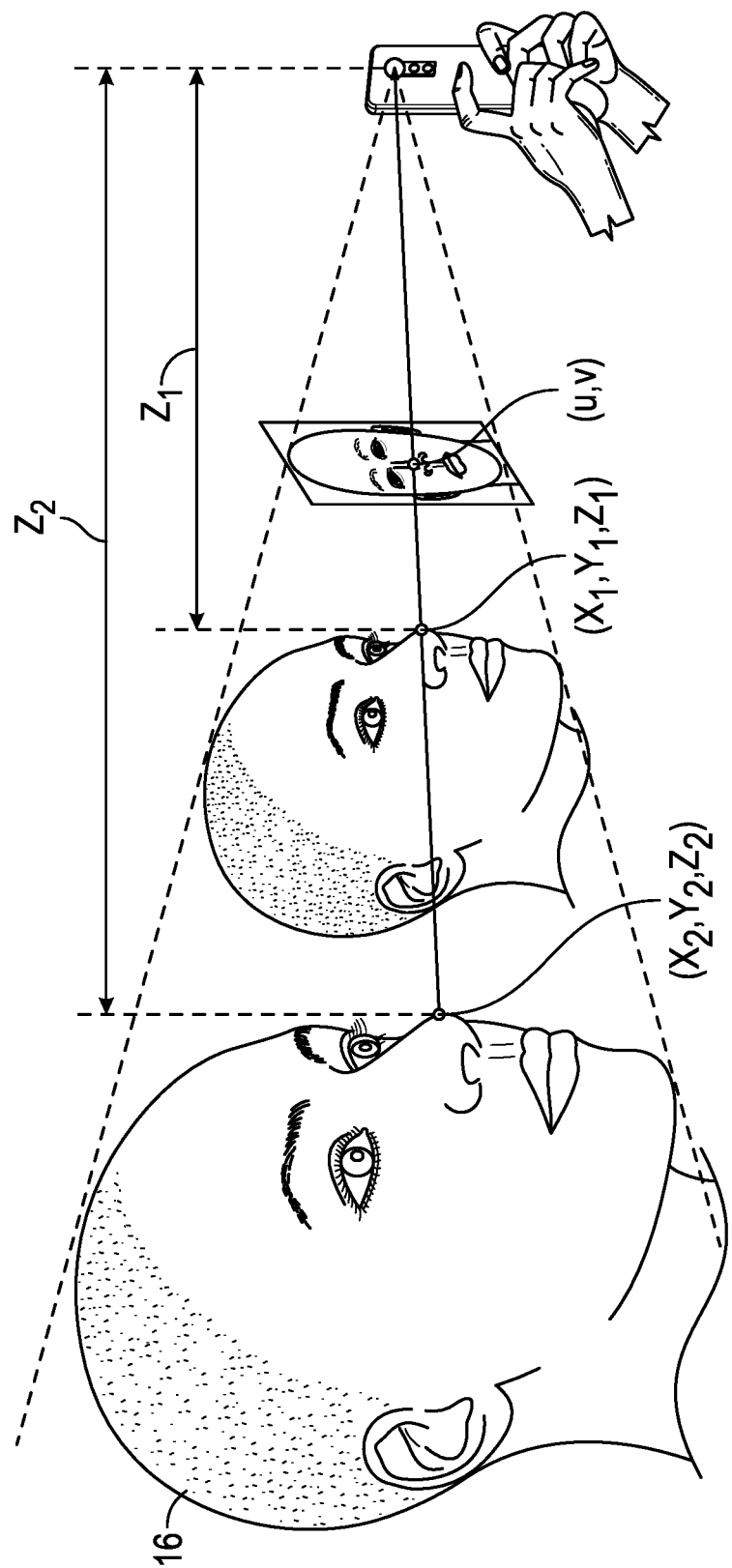

FIG. 3A and FIG. 3B illustrate image scale ambiguity when the single front facing monocular camera 155 images the user face 16. Without knowing a distance between the camera 155 and the user face 16, the scale of the user face 16 is not known. Both faces, the closer but smaller face and the farther but larger face, appear the same size in the image captured by the camera 155.

Figure 4:
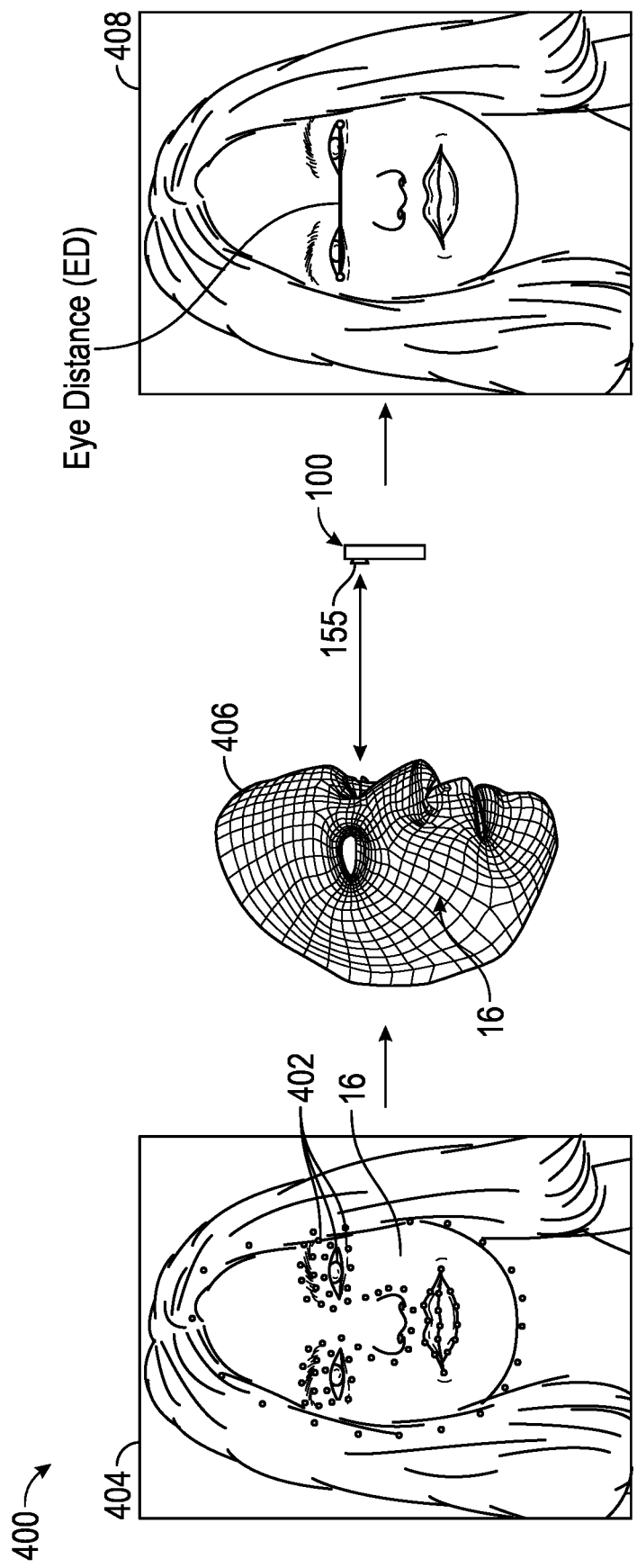
FIG. 4 in an illustration depicting a pipeline of a CPU determining scaling of the user's face using the single monocular front facing camera.

FIG. 4 illustrates a pipeline 400 of the CPU 120 determining scaling of the user face 16 using the single monocular front facing camera 155. CPU 120 first detects sparse features including face features 402 of the user face 16, such as the eyes, nose and mouth, as shown in image 404. The CPU 120 performs depth estimation of the face features 402 as shown in image 406, and then determines a scale of the user face 16 by measuring a distance between face features 402, such as an eye distance (ED) between the left edge of the left eye and the right edge of the right eye, as shown in image 408.

To measure the true scale of the face 16, in accordance with one example, the user 12 holds the smartphone 100 in front of the face 16 at about 15-20 cm for about 1 second with the whole face 16 within the field of view of the front facing camera 155 to capture the whole face. For improved accuracy, it is helpful if the face 16 and the front facing camera 155 are relatively static. During this process, one of the following described methods (Auto Focus Mode or Manual Focus Mode) is performed by the CPU 120 to determine the true scale of the face 16. In one example, the selection of the method is determined automatically based on the smartphone model.

Auto Focus Mode

Figure 5:
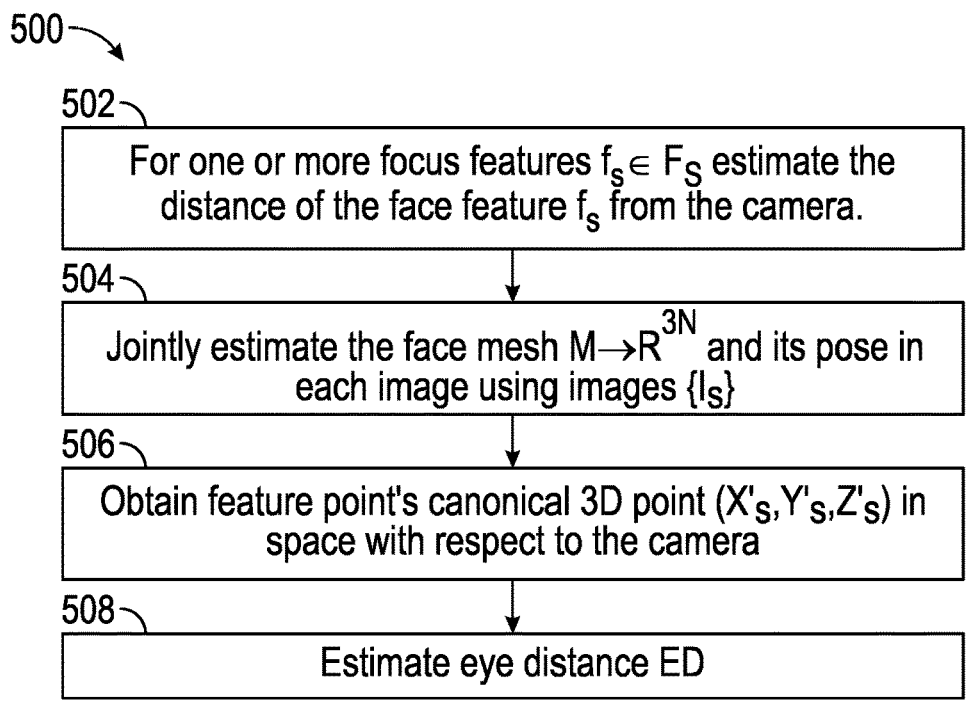
FIG. 5 is a flowchart of Auto Focus Mode steps for determining a true scale of a user face.

FIG. 5 is a flowchart of method 500 of Auto Focus Mode steps for determining a true scale of a user's face. Method 500 is performed by CPU 120 as follows.

CPU 120 defines a set of focus features, denoted by $F_S$, to include the set of landmarks on a user's face corresponding to the left and right corners of the two eyes and the left and right corners of the mouth.

At step 502, define an empty set of images S={ }

For one or more focus features $f_s \in F_S$:

Capture image 404 using camera 155 and run two dimensional (2D) facial landmark detection.

Find pixel $p_s$ corresponding to feature $f_s$.

Set front facing camera 155 to focus on a small window around pixel $p_s$

After the camera 155 auto-focus is complete, capture an image $I_s$ and read the camera's focus distance $z_s$. Focus distance $z_s$ represents the distance of the face feature $f_s$ from the camera 155.

Add $(I_s, z_s)$ to S.

At step 504, CPU 120 jointly estimates a face mesh $\mathcal{M} \rightarrow \mathbb{R}^{3N}$ and its pose in each image using images $\{I_s\}$. Note that this canonical mesh only represents the shape of the user's face but is not of true size. Let d' be the eye distance between the left and right eye outer corner feature points on the estimated canonical mesh.

At step 506, let eye distance estimates D={ }

For each $(I_s, z_s)$ in S

For feature $f_s$, using the fitted mesh and its pose, the feature point's canonical 3D point $(X'_s, Y'_s, Z'_s)$ in space is obtained with respect to the camera 155.

The eye distance based on this image is $d_s = z_s * d'/Z'_s$ using perspective scaling. Add $d_s$ to D.

At step 508, the final eye distance ED estimate is a robust mean of the values in D. CPU 120 uses mean, median or Hodges-Lehmann estimator.

Manual Focus Mode

Figure 6:
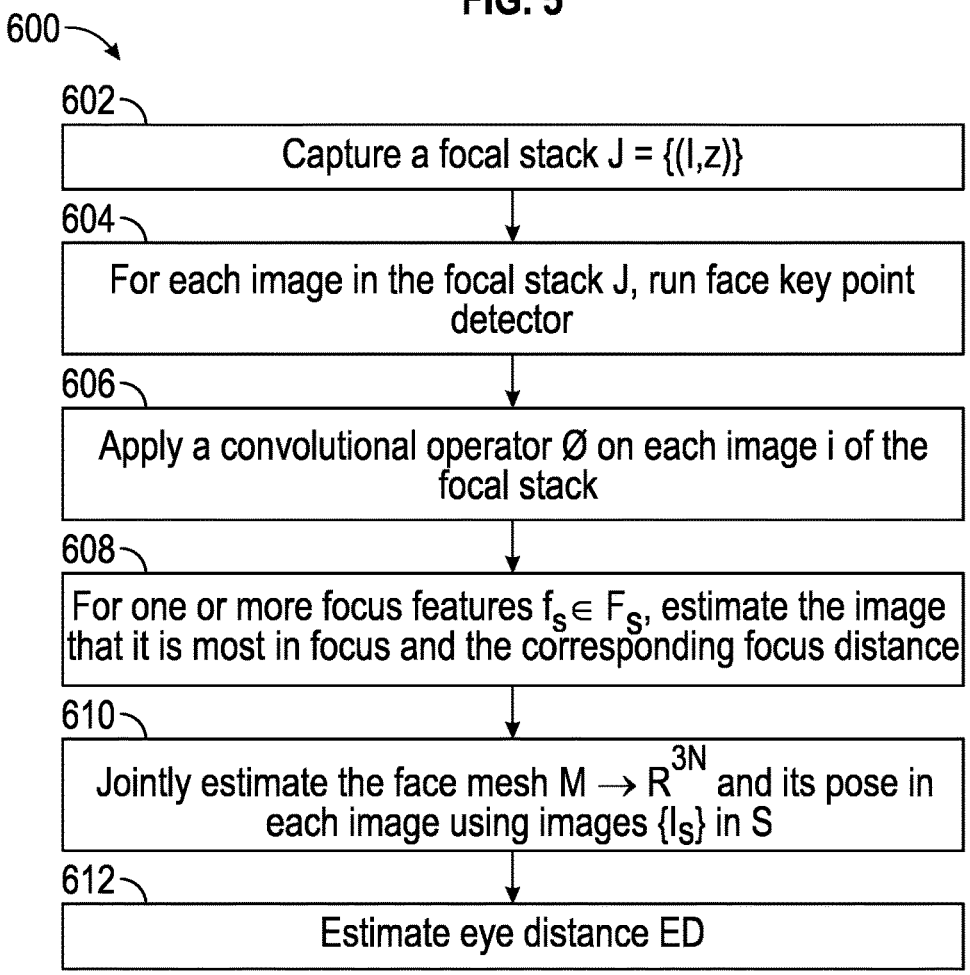
FIG. 6 is a flowchart of Manual Focus Mode steps for determining a true scale of a user face.

FIG. 6 is a flowchart of method 600 of Manual Focus Mode steps performed by CPU 120 for determining a true scale of a user face.

CPU 120 determining Face Scale from Focal Stack is performed as follows:

At step 602, capture a focal stack $\mathcal{J} = \{(I, z)\}$—a set of N images with different focal distances—using camera 155 by moving the camera lens from nearest to farthest from the image sensor. For each image I, the corresponding focus depth z is also saved. In this stack, various parts of the face come into focus and then go out of focus.

At step 604, for each image in the focal stack $\mathcal{J}$, run 2D facial landmark detection. Register the images so that the 2D landmark features align in each image. This creates a registered focal stack. $\mathcal{R} = \{\{J, z\}\}$ At step 606, apply a convolutional operator Ø (e.g., Laplacian, Ring Difference Filter) on each image $J_i$ of the registered focal stack $\mathcal{R}$. The response of these operators at each pixel is correlated to the degree of focus at that pixel and is called the focus measure.

$K_i = J_i * Ø$ for $i = \{1, \ldots, N\}$, where * is the convolution operator.

At step 608, define an empty set of images S={ }

For one or more focus features $f_s \in F_S$, estimate the image that it is most in focus and the corresponding focus distance.

$(I_s, z_s) = (I_i, z_i)$ such that $$\underset{i}{\mathrm{argmax}} K_i(s)$$

where $K_i(s)$ value of focus measure at pixel corresponding to feature $f_s$ in image i.

Add $(I_s, z_s)$ to S

At step 610, CPU 120 jointly estimates a face mesh $\mathcal{M} \rightarrow \mathbb{R}^{3N}$ and its pose in each image using images $\{I_s\}$. Note that this canonical mesh only represents the shape of the user's face but is not of true size. Let d' be the eye distance between the left and right eye outer corner feature points on the estimated canonical mesh.

Let eye distance estimates D={ }

For each $(I_s, z_s)$ in S

For feature $f_s$, using the fitted mesh and its pose, feature point's canonical 3D point $(X'_s, Y'_s, Z'_s)$ is obtained in space with respect to the camera 155.

The eye distance based on this image is $d_s = Z_s * d'/z'_s$ using perspective scaling. Add $d_s$ to D.

At step 612, the final eye distance ED estimate is a robust mean of the values in D. CPU 120 uses mean, median or Hodges-Lehmann estimator.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The features and flow charts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartphone 100 or other portable electronic devices. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as a main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the examples require the same features that are expressly recited. Rather, the protectable subject matter lies in less than all features of any single disclosed example.

While the foregoing has described what are considered to be the best mode and other examples, it is understood that various modifications may be made therein and that the subject matter disclosed herein may be implemented in various forms and examples, and that they may be applied in numerous applications, only some of which have been described herein.

The invention claimed is:

1. A device, comprising:
a monocular camera configured to capture images of a face, the captured images comprising a plurality of face features;
a processor configured to determine a distance between the monocular camera and the face, the processor configured to:
determine the plurality of face features in the captured images;
determine a scale of the face as a function of the determined plurality of face features by using a manual focus feature of the device to process a focal stack of the captured images based on the captured images, wherein each said captured image of the focal stack has a focal plane and the processor is configured to process the focal planes to determine the scale of the face;
apply a two-dimensional (2D) facial landmark detection algorithm to an in-focus one of said captured images to detect 2D facial landmarks and determine a focus distance between the camera and the face; and
estimate a three-dimensional (3D) mesh of the face of a unit size corresponding to the detected 2D facial landmarks.

2. The device of claim 1, wherein the processor is configured to use an auto-focus feature of the device to determine the scale of the face, wherein the auto-focus feature is configured to apply the two-dimensional (2D) facial landmark detection algorithm to an in-focus one of said captured images to detect 2D facial landmarks and determine an auto-focus distance between the camera and the face.

3. The device of claim 1, wherein the processor is configured to determine a distance between two of the plurality of face features to determine the scale of the face by combining the estimated 3D face mesh and the focus distance.

4. The device of claim 1, wherein the device further comprises a display and wherein the device is configured to produce and display a product image in association with the face on the display in accordance with the determined scale of the face.

5. The device of claim 4, wherein the processor is configured to present different sizes of the product on the display that is in accordance with the determined scale of the face.

6. A method of scaling a face, comprising:
capturing images using a monocular camera;
determining a plurality of face features in the captured images;
determining a distance between the monocular camera and the face; and
determining a scale of the face as a function of the determined plurality of face features by processing a focal stack of the captured images using a manual focus feature and based on the captured images, wherein each said captured image of the focal stack has a focal plane, wherein the determining the scale of the face comprises processing the focal planes;
applying a 2D facial landmark detection algorithm to an in-focus one of said captured images to detect 2D facial landmarks and determine a focus distance between the camera and the face; and
estimating a 3D mesh of the face of a unit size corresponding to the detected 2D facial landmarks and determining a distance between two of the plurality of face features to determine the scale of the face by combining the estimated 3D face mesh and the focus distance.

7. The method of claim 6, wherein the determining the scale of the face comprises:
determining an auto-focus distance between the camera and the face.

8. The method of claim 7, wherein the determining the scale of the face comprises:
combining the estimated 3D face mesh and the auto-focus distance.

9. A non-transitory computer-readable storage medium that stores instructions that when executed by a processor of a device comprising a monocular camera configured to capture images of a face, the captured images including a plurality of face features to determine a distance between the camera and the face, the instructions operable to determine the plurality of face features in the captured images and determine a scale of the face as a function of the determined plurality of face features by:
processing a focal stack of the captured images using a manual focus feature and based on the captured images, wherein each said captured images of the focal stack has a focal plane, wherein the determining the scale of the face comprises processing the focal planes;
applying a 2D facial landmark detection algorithm to an in-focus one of said captured images to detect 2D facial landmarks and determine a focus distance between the camera and the face; and
estimating a 3D mesh of the face of a unit size corresponding to the detected 2D facial landmarks and determining a distance between two of the plurality of face features to determine the scale of the face by combining the estimated 3D face mesh and the focus distance.

* * * * *